United States Patent [19]
Habegger

[11] Patent Number: 5,320,009
[45] Date of Patent: Jun. 14, 1994

[54] GUIDE BUSH

[76] Inventor: Harold Habegger, Sous-Graitery 10, 2738 Court, Switzerland

[21] Appl. No.: 947,336

[22] Filed: Sep. 18, 1992

[30] Foreign Application Priority Data

Sep. 18, 1991 [FR] France .................. 91 11593

[51] Int. Cl.$^5$ .................................. B23B 13/00
[52] U.S. Cl. ..................... 82/127; 279/20.1; 279/132
[58] Field of Search ............ 82/127; 279/20.1, 132, 279/126, 50, 57

[56] References Cited

U.S. PATENT DOCUMENTS

| | | | |
|---|---|---|---|
| 2,816,768 | 12/1957 | Stoner et al. | 279/50 |
| 3,552,243 | 5/1971 | Habegger. | |
| 4,258,598 | 3/1981 | Hoffmann | 82/127 |
| 4,445,697 | 5/1984 | Evans | 82/127 |
| 4,672,869 | 6/1987 | Hasslaver et al. | 82/127 |

FOREIGN PATENT DOCUMENTS

| | | | |
|---|---|---|---|
| 3543353 | 6/1987 | Fed. Rep. of Germany | 279/126 |
| 1678544 | 9/1991 | U.S.S.R. | 82/127 |

*Primary Examiner*—Mark Rosenbaum
*Assistant Examiner*—John M. Husar
*Attorney, Agent, or Firm*—Weil, Gotshal & Manges

[57] ABSTRACT

A guide bush is described, having a bush-holder and a quill integral with the bush support. The device has a clamp capable of rotating a workpiece, means for opening and closing the clamp and regulating means adapted to monitor the opening and closing means in order to compensate for changes in the dimensional tolerances of the workpiece, wherein the bush regulating means are adapted to operate the opening and closing means of the clamping means very quickly as a direct result of variations in the dimensional tolerances of the workpiece in order to provide a substantially constant pressure of the clamp on the workpiece. The bush is for use with a machine tool such as a travelling headstock automatic lathe.

22 Claims, 4 Drawing Sheets

GUIDE BUSH

FIELD OF THE INVENTION

The invention relates to a guide bush.

More specifically, it relates to a guide bush notably designed in particular for use with a machine tool such as a travelling headstock automatic lathe.

DESCRIPTION OF THE PRIOR ART

A guide bush is known of the fixed type, housed inside a support block by means of a bush-holder support, which has a quill integral with the bush-holder inside which a workpiece to be machined can be accommodated and rotatably supported.

This type of bush has the following disadvantages.

Firstly, where a workpiece having significant, notably positive, variations in dimensional tolerances, in other words where there are large increases in the outer diameter of the workpiece in certain areas, there is a risk of jamming which causes the workpiece to become wedged inside the bush or even causes variations in the angular speed of the workpiece in relation to the tool.

In the opposite case, i.e. in the presence of negative dimensional variations, that is when a workpiece has substantially localized reductions in its outer diameter, the machined product acquires an outer diameter that differs from the desired diameter (generally larger) due to displacement from the centre of the workpiece due to lateral thrust of the tool thereon.

Rotating bushes are available which, while they naturally prevent the risk of jamming, have the major disadvantage of transferring to the finished product any geometric faults existing on the workpiece as supplied.

Finally, adjustable bushes are known which have clamping means associated with a nut on which an outer, manual force can be applied. Again, this type of bush only very partially overcomes the above-mentioned problems. Although this adjustable bush makes it possible to overcome the dimensional variations of the workpiece to be machined, roughly and in a given series, permanent adjustment is impossible.

OBJECTS OF THE INVENTION

It is an object of the instant invention to overcome the above-mentioned disadvantages by providing a guide bush capable of overcoming all the variations in dimensional tolerances which can occur on a workpiece to be machined or between one workpiece and another, without outside intervention, that is in quasi automatic and permanent manner, by ensuring that geometric faults have no effect on the finished product. It is also an object of the present invention to provide a guide bush which makes it possible to machine finished pieces, machined to tolerances that are smaller than those of the workpiece.

BRIEF SUMMARY OF THE INVENTION

It is therefore an object of the present invention to provide a guide bush, notably designed to equip a machine tool such as a travelling headstock automatic lathe of the type comprising:

a bush-holder adapted to be positioned with respect to said lathe, a quill integral with the bush holder and comprising clamping means adapted to receive and rotatably guide a workpiece to be machined, means for opening and closing the clamping means so as to adjust the clamping of the latter on the workpiece, and regulating means adapted to monitor the opening and closing means in order to compensate for positive and negative variations in dimensional tolerances of the workpiece, wherein the said regulating means are capable of instantaneously actuating the means for opening and closing the said clamping means as a direct result of variations in the dimensional tolerances of the workpiece being machined, in order to provide a substantially constant pressure of the clamping means on the workpiece.

More particularly, the adjustment means of the invention are mechanically controlled by the workpiece itself.

It should also be noted that these adjustment or regulating means are driven by an oscillating rotating movement of the sheath, sensitive to said variations in the dimensional tolerances of the workpiece.

BRIEF DESCRIPTION OF THE DRAWINGS

Other characteristics and advantages of the invention may be seen from the following detailed description given by way of example with reference to the appended drawings in which.

DETAILED DESCRIPTION OF THE INVENTION

Figure 1:
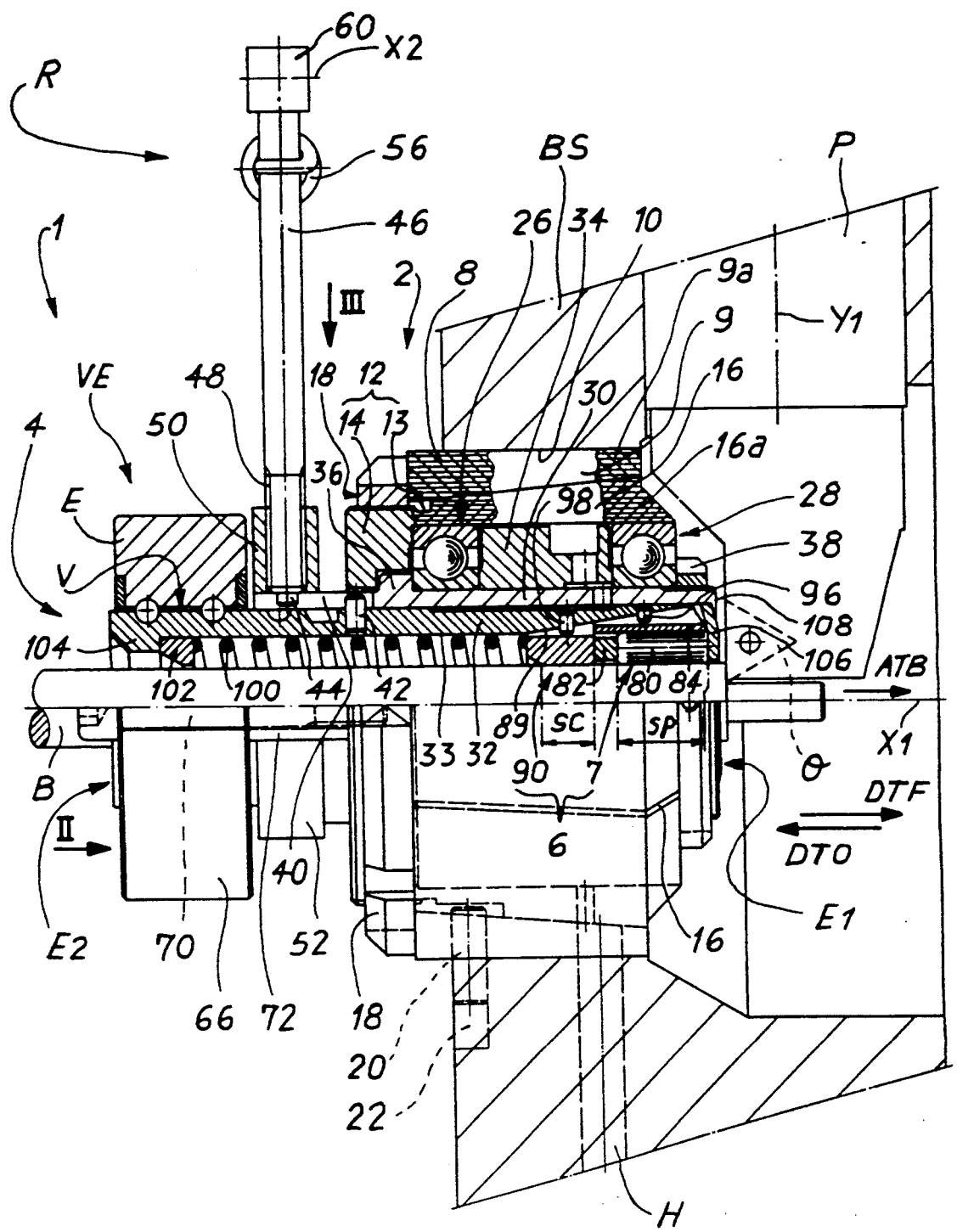
FIG. 1 is a semi-sectional longitudinal view of a guide bush of the invention, taken along the arrow I—I of the figure showing the bush-holder.

A preferred embodiment of a guide bush of the invention is described hereinbelow with reference to FIGS. 1 to 3.

The guide bush of the invention, which is generally allocated the reference numeral 1, is adapted for use with a machine tool such as a travelling headstock automatic lathe, not shown. For this purpose the bush 1 is housed at least partly inside a block support BS in which a tool carrier P with a tool O firmly mounted thereon, preferably by screwing, and being composed in the example shown in FIG. 1 of an interchangeable machining wafer, is able to move along a transverse axis Y1.

The guide bush 1 has a bush-holder 2 which is firmly mounted on the block support BS.

A quill designated by the reference numeral 4 is mounted inside this block support BS. The quill 4 is moveable rotatably about a longitudinal axis of rotation X1 which is perpendicular to the transverse axis Y1 in the embodiment shown.

Coaxial clamping means 6, capable of receiving and rotatably guiding a workpiece or stock bar to be machined B, are housed inside the quill 4.

Figure 2:
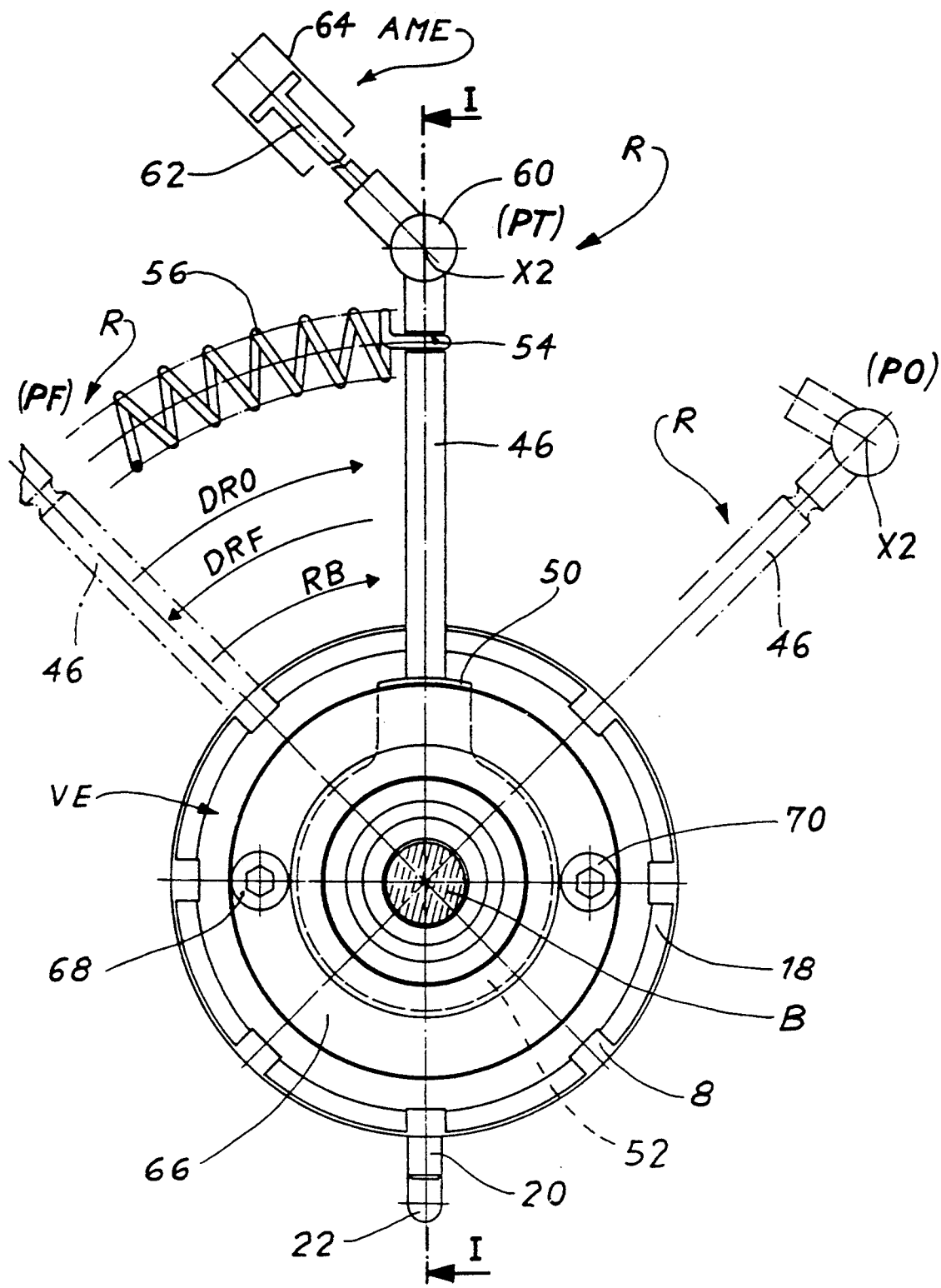
FIG. 2 is a front view of the bush of the invention taken along the arrow II of FIG. 1 and showing in solid lines return means and bush actuating means, in a working position (PT) in solid lines, and in opening (PO) and closing (PF) positions respectively in broken lines.
Figure 3:
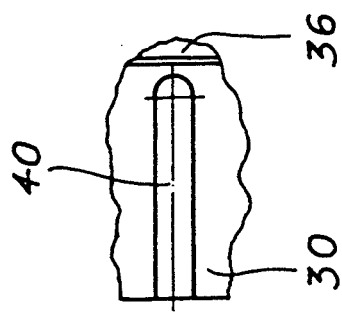
FIG. 3 is a top view of a longitudinal keyway provided in a sheath of the bush of the invention, this figure being taken along the arrow III of FIG. 1.

This workpiece B is on the one hand driven rotatably about the axis X1 in the direction of rotation shown by the arrow RB on FIG. 2, and on the other hand advanced transversely along the axis X1 in the direction shown by the arrow ATB in FIG. 1. The workpiece B is thus driven in rotation and transversely in relation to the bush 1 and in relation to the tool O by conventional drive means, not shown. Since the means for driving the workpiece B are not the object of the present invention, they will consequently not be described in greater detail.

The bush-holder 2 has an outer sleeve 8 made of a metallic material which has a slit 9 passing therethrough which is partially filled with a synthetic material such as silicone. This material forms a resilient and tight sealing tongue 9a which in particular permits the radial extension of the outer sleeve 8 which, since it is housed directly inside a boring 10 provided in the block support BS, can be fixed therein.

The bush-holder 2 also has an inner sleeve 12 which is housed and wedged inside the outer sleeve 8. For this purpose the inner sleeve 12 has a tubular body 13 of frustroconical outer shape, which engages inside a corresponding frustroconical boring provided directly in the outer sleeve 8.

At one end of the body 13 the inner sleeve 12 has an end or base 14 which is threaded on the outside and onto which a notched nut 18 axially abutting against a side flange of the outer sleeve 8 is screwed. By pushing against the outer sleeve 8, the nut 18 exerts traction on the inner sleeve 12 and notably on its tubular body 13. Because of the conical connection constituting a wedge between the two sleeves 8 and 12, this traction makes it possible to exert a radial thrust on the body 13 towards the axis X1.

In order to achieve this, the inner sleeve 12 has resilient slits 16 provided longitudinally by milling directly in the body 13 up to the threaded end or base 14. Sealing tongues 16a, also made of a synthetic material such as silicone, are injected into the slits 16 and serve the same function as the tongues 9a of the outer sleeve 8. It will be noted that the parts of the slits 9 and 16 that are left empty are arranged so that they coincide so as to permit passage of a lubricant, the latter being carried across the bush support 2 as well as towards the outside and the inside of the sheath 4 via a supply channel H provided in the block support BS. For this purpose, the bush-holder 2 is angularly positioned by means of an indexing pin 20 housed partly in the bush-holder 2 by radially penetrating into the two sleeves 8 and 12 and partly in the radial positioning groove 22 provided in the block support BS.

Two bearings, such as notably ball-bearings having a series of balls 26 and 28, these latter being intended to support and rotatably guide the sheath 4, are housed in a boring provided directly in the body 13 of the inner sleeve 12. The bearings 26 and 28 are retained firmly transversely and are axially positioned in relation to the longitudinal axis X1 by the radial thrust exerted by the body 13 on their outer ring, not numbered. The outer ring of the ball-bearing 26 bears axially against a shoulder (also not numbered) provided directly in the end or base 14.

It will be noted that the block support BS, the bush-holder 2 (composed of the two outer 8 and inner 12 sleeves respectively and of the nut 18) as well as the outer rings of the ball-bearings 26 and 28 are firmly secured, especially in relation to the travelling headstock automatic lathe by fixing means (not shown).

The sheath 4 has two substantially cylindrical sockets or coaxial tubular spindles 30 and 32 designated outer (30) and inner (32) respectively. The inner rings (not numbered) of the ball-bearings 26 and 28 respectively are directly engaged on one part of the outer socket 30, called the front with reference to the direction of forwards movement of the workpiece B, which is housed inside the bush-holder 2. The quill 4 which is thus caused to rotate by and in the bush-holder 2 is mechanically integral with the bush-holder 2 by means of the two ball-bearings 26 and 28.

A spacer 34 which is interposed and which bears axially between the inner rings of said bearings, is engaged between the inner rings of said ball-bearings 26 and 28 and on the outer socket 30. It will also be noted that the inner ring of the ball-bearing 26 rests laterally on a shoulder which is formed by a radially projecting collar 36 provided on the outer socket 30. A notched nut 38 is screwed directly onto one free end E1 of the quill 4, as close as possible to the tool O and more particularly on a free threaded end of the outer tubular socket 30 having the same reference numeral. The screw 38 laterally and directly locks the inner ring of the ball-bearing 28 and axially retains the two bearings 26 and 28 as well as the spacer 34 therebetween on the outer socket 30.

It will be noted here that the sheath 4, and notably the two outer 30 and inner 32 sockets or muffs respectively, the inner rings of the bearings 26 and 28, the spacer 34 as well as the nut 38 are rotatably mobile on the one hand about the longitudinal axis of rotation X1 and, on the other hand, in relation to the bush-holder 2 as well as in relation to the block support BS.

It should, however, be noted that the outer socket or muff 30, as well as all the elements 26, 28, 34 and 38 which bear from the outside thereon are firmly retained transversely in relation to the block support BS and in relation to the bush-holder 2.

A partially oblong key groove 40 which opens on both sides in a radial direction, and notably opposite the inner socket or muff 32, is provided on the outer tubular socket 30, and notably on a part thereof which is termed the rear and which projects outside the bush-holder 2 in the opposite direction to the tool O. The key groove 40 also opens axially in a direction opposite the tool, facing a ring of a screw-nut VE system to be described hereinbelow.

Housed inside the key groove 40 is a first locking pin 42 which is firmly retained inside the inner socket 32, notably by forced pressure, i.e. by driving.

This locking pin 42 which projects radially from the inner socket 32 is adapted so as to be able to slide axially inside the groove 40 which freely guides the pin 42 transversely along the longitudinal axis X1 while ensuring the coupling in rotation of the two sockets 30 and 32 in relation to one another. It will thus be noted that the pin 42 and the groove 40 form rotation securing means for rotation of the outer 30 and inner 32 sockets together, while enabling them to freely slide transversely in relation to each other. In other words, the locking pin 42 and the radially opening groove 40 thus act as fastening or key means.

Projecting radially inside the groove 40 is a nipple 44 provided at the free end of a rod forming a lever arm 46 which has a thread 48 near this nipple 44.

The threaded rod 46 is screwed into a tapped part 50 of a collar 52 by a sliding adjustment on the rear part of the outer socket 30 which projects to the outside of the bush-holder 2 and in which the groove 40 is directly recessed. The collar 52 thus directly overlaps the key groove 40.

Retention of the rod 46 in relation to the outer socket 30 as well as thereon is ensured solely by the abutment of the thread 48 of the rod 46 on the outer circumference of the socket 30.

It should be noted that the nipple 44 ensures the linkage and mechanical connection as far as rotation is concerned between the rod 46 and the outer socket 30.

At the other end of the rod 46 there is provided a recess 54 (FIG. 2) within which is housed a first end of a resilient member composed of a helicoidal traction spring 56, the second end (not shown) of which is firmly retained by conventional attachment means to a fixed support (not shown).

A joint 60 capable of pivoting about a second longitudinal axis X2 of rotation, parallel to the first X1 and comprising part of external actuating means AME which are shown here in very diagrammatic form by a screw jack formed of a piston 62 sliding inside a cylinder 64 firmly retained by the support means, (not shown) is provided in the vicinity of the traction spring 56 and at the end closest to the rod 46. The actuating means AME make it possible to actuate positively, that is at will up to a desired position, the rotation of the sheath 4 towards at least two positions of opening (PO) and closing (PF) respectively of the clamping means 6 and also make it possible to retain the said sheath in these two positions, which are shown in broken lines in FIG. 2. To achieve this, the actuating means AME have a conventional control circuit (not shown) of the pneumatic and/or electronic type capable of transversely guiding the piston 62. Controlled opening of the clamping means 6 makes it possible to extract a workpiece, and notably a discard at the end of machining, whereas the controlled closure permits the feeding of workpieces to be machined by immobilizing the workpiece, which in this case acts as a abutment.

It will be understood from the following description that the rod 46 and the traction spring 56 constitute the resilient return means of the sheath 4, these return means having the general designation R.

The return means R are capable of resiliently resetting any displacement in rotation of the sheath 4 effected in one direction of rotation, termed opening (shown in FIG. 2 by the arrow DRO). These resilient return means R thus have a permanent tendency to bring the sheath 4 back in a direction DRF termed closure, opposite to the direction of opening DRO. It will be understood from the following explanation that the directions of rotation DRO and DRF correspond respectively to the directions of opening and closing of the clamping means 6 which are housed inside the sheath or quill 4.

The guide bush 1 of the invention also has a screw-nut system VE arranged on one free end E2 (FIG. 1) of the sheath 4. This extremity, which is opposite the free extremity E1, projects outside the bush-holder 2 in a direction opposite the tool O-tool holder P assembly.

The screw-nut system VE has a ballscrew the screw V of which is directly disposed on the outer circumference of the inner socket 32, near its free end E2 and on its rear part by the means of a suitable hemispherical recess.

The screw-nut assembly VE, the screw V of which is thus disposed directly on the sheath 4, also has a nut E which is disposed in a ring 66 firmly mounted in relation to the bush-holder 2 and mounted directly thereon by means of two headed screws 68 and 70, these latter being screwed into tappings provided inside the end 14 of the inner sleeve 12.

Spacers 72 (only one of which has been partly shown in FIG. 1) composed of tubular rings are engaged around each of the screws 68 and 70 and are laterally interposed between the ring forming the nut 66 and the end 14 of the inner sleeve 12.

It should also be noted that the screws 68 and 70 associated respectively with the spacers 72 form angular displacement stops for the rod 46.

The clamping means 6, which are shaped in order to receive and rotatably guide a supported section SP of the workpiece to be machined B, is housed inside the sheath 4, and in particular in the inner socket 32.

Figure 5:
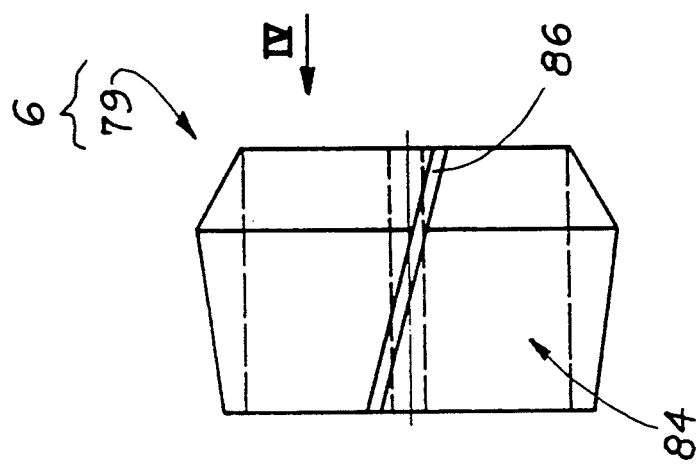
FIG. 5 is a side view of the bearing of FIG. 4.
Figure 4:
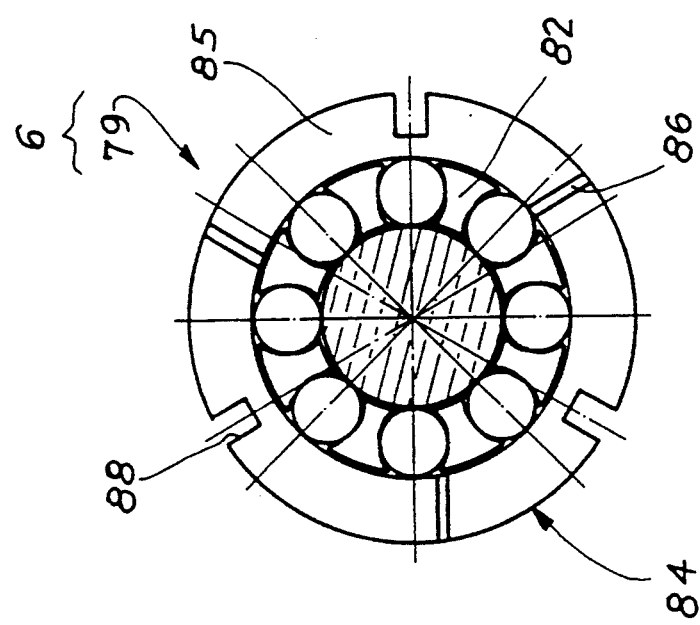
FIG. 4 is a front view of a bearing of a clamping means provided on the bush of FIG. 1 and taken along the arrow IV of FIG. 5.

The clamping means 6, which are shown in greater detail in FIGS. 4 and 5, are composed of a bearing 79 having an assembly of rollers 80 freely rotatably mounted directly in contact (by rolling friction) on the outer circumference of the supported section SP of the workpiece to be machined B. The rollers 80 are radially retained by being enclosed in a cage 82. The cage 82 as well as the rollers 80 are housed and retained from outside in a radial direction by means of an outer ring 84 which is composed of three sectors (only one of which 85 has been given a reference) separated by spacer slits 86. The sectors 85 and the ring 84 have an outer shape of the double frustroconical type, termed biconical.

The biconical ring 84 also has three longitudinal grooves 88 which are respectively provided on the outside of the segments 85 and which open on the one hand axially on both sides on the ring 84 and on the other hand radially only towards the outside, opposite the socket 32 (FIG. 1). The grooves 88 are oriented with respect to the axis of rotation X1 and they are staggered by 120° in respect of one another. The outer frustroconical circumference termed the rear of the ring 84 is shaped so as to engage inside the free end E1 of the inner socket 32 and more particularly inside a seating 89 of corresponding frustroconical shape. It will be noted that this rear frustroconical circumference is the only one which is functional, only the front circumference permitting release.

Figure 7:
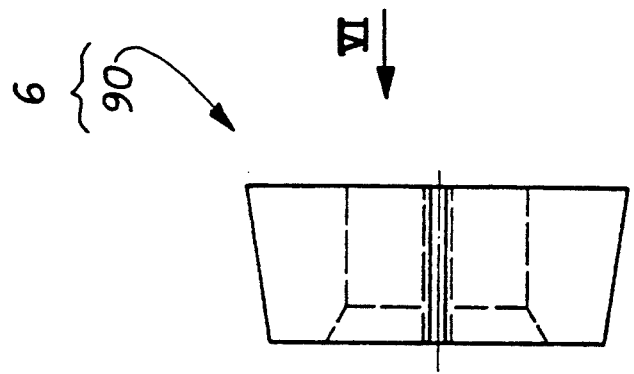
FIG. 7 is a side view of the sensor means of FIG. 6.
Figure 6:
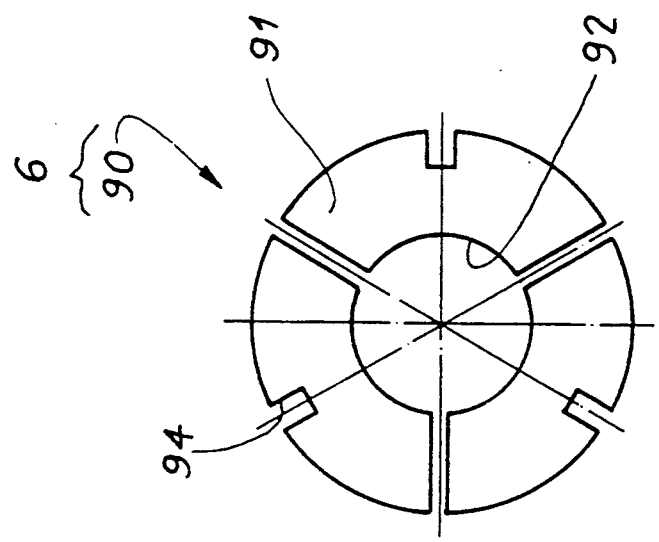
FIG. 6 is a front view of sensor means provided on the bush of FIG. 1 and taken along the arrow VI of FIG. 7.

Disposed upstream of the roller bearing 79 (still in relation to the direction of forwards transverse movement ATB of the workpiece to be machined B, FIG. 1) are sensor means 90 composed, as more clearly visible in FIGS. 6 and 7, of three segments (only one of which 91 has a reference numeral) of outer frustroconical shape adapted to be housed inside the terminal seating 89.

The three segments 91 which form the sensor means 90 constitute a cylindrical boring 92 of variable diameter, this boring being in contact with permanent friction (sliding friction) against the workpiece to be machined B, and in particular against one section thereof termed the controlled section SC. The sensor means 90 are capable of detecting every negative and/or positive dimensional variation of the workpiece B and they are able at any instant to detect every variation in the diameter of the workpiece B of the controlled section SC when this workpiece is driven by a rotating movement. These sensor means 90 notably form detection means of said dimensional variations.

It will be noted that the controlled section SC is advantageously arranged on the workpiece B directly in front of the supported section SP in relation to the direction of transverse forwards movement ATB of the workpiece B, that is that it is arranged upstream of this supported section SP.

It will be noted that the three segments 91 which form the sensor means 90 each have one groove 94, these latter having the same configuration as that of the grooves 88.

It should be noted that the grooves 88 and 94 respectively of the bearing 79 and of the sensor means 90 are adapted to receive respectively the second and third rotation blocking pins 96 and 98 which project radially and which are firmly held, notably by forced pressure of the driven type inside the socket 32.

It will thus be understood that the sensor means 90 as well as the bearing 79 together form the clamping means 6 which are of the friction clamping type. The sensor means form the entry of the clamping means 6 which explains why the boring 92 is bevelled at the rear in the direction of the end E2 of the sheath 4, the extremity by which the workpiece B is introduced.

These sensor means 90 and the bearing 79 rotate together with on the one hand the tubular socket 32 by the means of the assemblies pins 96,98-grooves 88,94 which form wedge-shaped connections and on the other hand with the outer tubular socket 30 by means of the pin 42 and the groove 40. The sensor means 90 and the bearing 79 which form the friction clamping means 6 are thus rotatably integral with the sheath 4. Nevertheless these elements 90 and 76 can slide freely by axial displacement along the axis X1 in relation to the sheath 4 and notably in relation to the inner tubular socket 32.

Housed inside the tubular socket 32 is another resilient member composed of a helicoidal compression spring 100 disposed directly and coaxially inside a cylindrical boring 33 provided in the inner socket 32, as a continuation of the frustroconical seating 89 and contiguous thereto.

It will be noted that the helicoidal compression spring 100 rests laterally by its two ends, and is thus placed under tension, on the one hand against the sensor means 90 and, on the other hand, against an adjusting wedge 102 which is housed in the boring 33 and which is axially maintained therein by a shaped shoulder on a collar 104 provided at the end E2 of the sheath 4 and more particularly at the corresponding free end of the socket 32.

This adjusting wedge 102 as well as the collar 104 each have a bevel making it possible to introduce the workpiece to be machined B into the sheath 4.

The wedge 102 can be chosen or machined in a thickness as a function of the force which it is desired to apply axially to the clamping means 6.

It will also be noted that this force is transmitted to the bearing 79 of the clamping means 6 by the intermediary of the sensor means 90 which abut laterally against the cage 82 and against the segments 85 of the ring 84.

The bearing 79 rests by means of the rollers 80 in axial contact against a stop composed of a small cup 106 housed directly inside the outer socket 30 and retained therein by a band 108 formed at the free extremity E1 of the socket 30.

In operation, the guide bush of the invention functions as follows.

It is firstly proposed to describe the automatic mode of operation where the actuating means AME are rendered inoperable for example by an open connection of their pneumatic circuit, not shown.

When a workpiece or stock bar B, which is rotated by the rotating movement RB and which is being machined by the tool O or which has just been introduced in the quill 4 by the input end E1 has a controlled section SC of an outer diameter substantially larger (positive variations in dimensional tolerances) than that of the boring 92 of the sensor means 90 or of the supported section SP of the workpiece B, mechanical jamming immediately occurs due to the friction between the sensor means 90 and the workpiece B because of the adjustment which becomes tightened between this controlled section SC and the sensor means 90.

This jamming immediately rotates the sensor means 90 which are much more sensitive than the bearing 79 to any dimensional variation in the workpiece because of their frictional contact therewith, said friction being of the sliding friction type.

The sensor means 90 being mechanically secured at least in rotation to the quill 4, as explained hereinabove, the two sockets 30 and 32 are driven in subsequent manner in rotation about the longitudinal axis of rotation X1, causing immediate angular displacement of the entire sheath 4 (and of the rod 46) in the direction of rotation shown by the arrow DRO.

Since the socket 30 is connected to the screw-nut system VE which notably presents a thread to the left, rotation of the sheath 4 automatically induces only a concomitant translatory displacement of the inner tubular socket 32 in the direction of translatory displacement shown by the arrow DTO in FIG. 1.

Since the inner socket 32 moves towards the rear in FIG. 1, the frustroconical seating 89 tends to leave its contact (tangential separation and sliding) with the sensor means 90 and with the bearing 79 constituting the clamping means 6.

This separation is ensured by the action of the helicoidal compression spring 100 which drives back and separates the sensor means 90 as well as the bearing 79 axially from the socket 32 and above all from the terminal seating 89. Because of this it will be noted that the helicoidal compression spring 100 forms a first resilient member capable of axially displacing the clamping means 6 in relation to the sheath 4 to release it radially.

It can also be seen that (1) the translatory displacement of the inner socket 32 away from the sensor means 90 and the bearing 79, and that (2) the screw-nut system VE in association with the first resilient member 100 constitute opening means of the clamping means 6 which are directly sensitive to the positive dimensional variations of the workpiece to be machined B, the helicoidal spring 100 or first resilient member being directly actuated by the translatory displacement of the sheath 4 and in particular by the transverse displacement of the socket 30.

Moreover, if in the opposite case the controlled section SC of the workpiece to be machined B has an outer diameter smaller than that of the supported section SP of this same workpiece B (negative variations of dimensional tolerances) play is created between the outer circumference of the controlled section SC and the boring 92 of the sensor means 90, which permits the return means R (which have, incidentally been previously displaced) from bringing the sheath back, in the direction of rotation shown by the arrow DRF in FIG. 2, into a direction of rotation termed direction of closing.

It will be noted that this direction of closing is opposite to the direction of rotation of the workpiece B shown in FIG. 2 by the arrow RB. Because the rod 46 of the return means is mechanically subjected in rotation to the quill 4 by the outer socket 30, due to the screw-nut system VE which forms movement transformation means, the return of the rod 46 causes transverse displacement of the quill 4 and notably of the inner socket 32, along a direction of displacement shown by the arrow DTF (FIG. 1).

As a consequence hereof, the conical seating 89 returns or has the tendency to return to press against the sensor means as well as against the bearing 79, which generates radial displacement of the clamping means 6 towards the workpiece B and notably towards the supported section SP or at least that which increases the pressure of tightening thereon.

It will thus be seen that, by being connected to a traction spring 56, the rod 46, which forms one arm of the lever solid with the quill 4, constitutes return means R but also, in association with the inner socket 32, closing means of the clamping means 6. It will be noted that the angular displacements of the rod 46 can be limited between the two stops composed of the spacers 72 and the screws 68 and 70. In this case the rod 46 and the return means R of the bush of the invention occupy their position, termed the working position, which has the reference PT and which is shown in solid lines in FIG. 2.

It will also be noted that the return means R which are composed of the resilient member, termed the second resilient member, formed by the spring 56 connected to the quill 4, are capable of inducing rotating movement of this sheath and its concomitant translatory displacement to radially urge the clamping means 6 in its radial direction of closure, that is to say towards the workpiece B.

It will moreover be noted that on the functional level, the closing means of the clamping means, which are composed of the return means R as well as more precisely of the conical terminal seating 89 of the inner socket 32 and by the corresponding frustroconical regions of the bearing 79, are directly sensitive to negative dimensional variations of the workpiece B.

It may also be noted that the sensor means 90 form guiding means of the opening means and of the closing means, permitting the almost instantaneous and automatic adjustment of these latter on the workpiece B.

It will be understood from the foregoing that the quill 4 presents an oscillating rotating movement about the working position (PT) in permanent search of equilibrium between an opening action and a closing action of the clamping means 6 in relation to the workpiece B.

Adjustment means have therefore been provided guided by an oscillating rotating movement of the quill, said movement being sensitive to the variations in dimensional tolerance of the workpiece B. It will also be noted that on the functional level, the adjustment means of the invention are mechanically controlled by the workpiece itself.

These adjustment means which are capable of controlling the opening and closing means of the bush to compensate for positive and negative variations in dimensional tolerance of the workpiece are capable of instantaneously actuating the opening and closing means of the clamping means 6, directly in response to the variations in dimensional tolerances of the workpiece to be machined, to supply pressure of the clamping means on the workpiece B which is substantially constant.

It will be noted that the functional characteristics of the guide bush of the invention thus operate as a result of the arrangement of the movement transformation members formed by the screw-nut system VE which is associated with the quill 4 and which is adapted to transform the oscillating rotating movement of the quill 4 in a concomitant forwards or backwards translatory displacement thereof, along the arrows DTO or DTF respectively, this translatory displacement being capable of directly actuating the opening and closing means of the clamping means 6.

The controlled operation mode is similar to the mode of operation previously described. The controlled operation mode does, however, differ in the control of the opening and closing means, which occurs in a positive manner due to the action of the control means AME and notably of the screw jack 62,64. The sensor means 90 are thus in a state of rest, this mode of operation being capable of being put into operation regardless of the state of movement of the workpiece, i.e. when it is both in the dynamic or static state. The rod 46 always actuates closure of the clamping means 6 due to the kinemat:,cs and to the actuation of the previously described elements under the effect of the spring 56 which may be assisted by the control means AME.

In addition, the rod 46 can control the opening of the clamping means 6 by the rotation and subsequent displacement of the quill or sheath 4, as explained hereinabove, this time solely under the effect of the actuating means AME which become priorities in relation to the detection and guiding means formed inter alia by the sensor means 90.

Finally, it should be noted that in an embodiment that is not shown, the clamping means 6 can be composed solely of segments, such as the segments 91 of FIG. 6, covering the two sections controlled SC and supported SP respectively, without having roller bearings.

Clamping means of this type are thus entirely friction-based clamping means in which the bearing simultaneously forms the sensor means.

I claim:

1. A guide bushing especially adapted for use with a machine tool, comprising:
    a bushing-holder and means for positioning said bushing-holder with respect to said machine tool;
    a quill engaged with the bushing-holder;
    clamping means for supporting and rotatably guiding a workpiece to be machined, said clamping means being in substantially fixed relation to the bushing-holder during normal working conditions of the guide bushing, said clamping means permitting said workpiece to move in translation along a translation advance direction;
    means for opening and closing the clamping means so as to adjust the clamping of the latter about the workpiece; and
    regulating means for controlling the operation of said opening and closing means in order to compensate for positive and negative radial dimensional variations in the workpiece;
    wherein said regulating means comprise sensor means mounted in continual sliding frictional contact with the workpiece for sensing said dimensional variations therein, said sensor means being responsive to the said dimensional variations, for causing a rotating oscillating movement of the quill, which in turn, controls the operation of the said opening and closing means.

2. A guide bushing according to claim 1 wherein said sensor means are mounted within said quill, upstream of said clamping means with respect to the translation advance direction of the workpiece.

3. A guide bushing according to claim 1 wherein said sensor means are substantially rotationally fixed to said quill and are able to move in translation with respect to said quill.

4. A guide bushing according to claim 2 wherein said sensor means are substantially rotationally fixed to said quill and are able to move in translation with respect to said quill.

5. A guide bushing according to claim 2 wherein said sensor means include a segment defining in the quill a boring having a variable diameter.

6. A guide bushing according to claim 2 wherein said sensor means have an frustroconical exterior shape, said quill having a corresponding frustroconical interior shape for engaging with said sensor means.

7. A guide bushing according to claim 1 wherein said clamping means including rollers freely rotatably mounted therein.

8. A guide bushing according to claim 7 wherein said rollers are located between said sensor means and an open end of the quill from which a part of the workpiece which is to be machined, can protrude.

9. A guide bushing according to claim 8 wherein said clamping means include a cage for positioning said rollers and further including a ring having a frustroconical exterior shape for being radically maintaining in said rollers, said quill having a corresponding frustroconical seat for engaging the frustroconical shape of said ring.

10. A guide bushing according to claim 7 wherein said clamping means include a cage for positioning said rollers, and a ring for radially maintaining said rollers, said ring having a frustroconical exterior shape, said quill having a corresponding frustroconical seat for engaging the frustroconical shape of said ring.

11. A guide bushing according to claim 10 wherein said sensor means laterally abut said clamping means for moving said clamping mean axially away from the frustroconical seating of the quill for opening said clamping means.

12. A guide bushing according to claim 1 wherein said quill comprises two coaxial spindles freely mounted in translation with respect to one another.

13. A guide bushing according to claim 12 further including a pin and a groove, said pin being positioned for translation in said groove for rotationally fixing said spindles.

14. A guide bushing according to claim 1 and further comprising transformational movement members for converting the rotating oscillating movement of the quill into a concomitant translational movement thereof, this translational movement of the quill directly actuating the opening and closing means.

15. A guide bushing according to claim 14 wherein the transformational movement members comprise a screw-nut system associated with the quill.

16. A guide bushing according to claim 15 further including a ring substantially rigidly mounted with respect to the bushing holder wherein the screw-nut system includes a ball screw, the screw of which is disposed in said ring.

17. A guide bushing according to claim 14 wherein the opening means includes a first resilient member actuated by the translation movement of the quill.

18. A guide bushing according to claim 17 wherein the first resilient member includes a helicoidal compression spring housed inside the quill.

19. A guide bushing according to claim 18 wherein the helicoidal compression spring is capable of moving the clamping means axially in relation to the quill for opening said clamping means.

20. A guide bushing according to claim 1 wherein the means for closing the clamping means include return means for the counter-rotation of the quill.

21. A guide bushing according to claim 20 wherein the return means include a second resilient member connected to the quill and capable of inducing its rotating movement and its concomitant translatory movement to radially urge the clamping means in its radial closing direction.

22. A guide bushing according to claim 21 wherein said second resilient member includes a traction spring and the return means includes a rod constituting a lever arm rotatably attached to the quill and connected to said rod, said rod being limited in its angular movement between two stops.

* * * * *